(12) United States Patent
Rainear et al.

(10) Patent No.: US 7,743,738 B2
(45) Date of Patent: Jun. 29, 2010

(54) SCAVENGING PHOSPHORUS, SULFUR, AND LEAD FROM COMBUSTION EXHAUST USING TUNGSTEN COMPOUNDS AND LUBRICANT

(75) Inventors: Dennis H. Rainear, Richmond, VA (US); Allen A. Aradi, Glen Allen, VA (US); Joseph W. Roos, Mechanicsville, VA (US)

(73) Assignee: Afton Chemical Corporation, Richmond, VA (US)

( * ) Notice: Subject to any disclaimer, the term of this patent is extended or adjusted under 35 U.S.C. 154(b) by 214 days.

(21) Appl. No.: 11/680,752

(22) Filed: Mar. 1, 2007

(65) Prior Publication Data

US 2008/0209885 A1 Sep. 4, 2008

(51) Int. Cl.
F02B 43/00 (2006.01)

(52) U.S. Cl. .................. 123/1 A; 123/435; 123/703; 423/213.2; 423/213.5; 502/244; 502/318

(58) Field of Classification Search ............. 423/213.2, 423/213.5; 502/244, 318; 508/194, 437, 508/454, 518, 185, 199; 60/299, 303, 297, 60/274, 285; 123/435, 703, 406.12, 144, 123/195 A, 1 A; F02B 43/00

See application file for complete search history.

(56) References Cited

U.S. PATENT DOCUMENTS

| | | | |
|---|---|---|---|
| 2,511,028 A | 6/1950 | Whitman | |
| 2,606,924 A | 8/1952 | Whitman | |
| 2,606,925 A | 8/1952 | Whitman | |
| 2,606,928 A | 8/1952 | Barkdoll et al. | |
| 3,230,034 A * | 1/1966 | Stiles ............... | 423/213.2 |
| 3,442,808 A | 5/1969 | Thornton et al. | |
| 3,697,574 A | 10/1972 | Piasek et al. | |
| 3,914,307 A | 10/1975 | Massie | |
| 3,959,374 A | 5/1976 | Brennan et al. | |
| 4,144,181 A | 3/1979 | Elliott et al. | |
| 4,293,687 A | 10/1981 | Weissel et al. | |
| 4,340,689 A | 7/1982 | Joffrion | |
| 4,394,523 A | 7/1983 | Allen | |
| 4,448,995 A | 5/1984 | Allen | |
| 4,587,329 A | 5/1986 | Tomalia et al. | |
| 4,670,515 A | 6/1987 | Olivier | |
| 4,737,550 A | 4/1988 | Tomalia | |
| 4,754,070 A | 6/1988 | Casey et al. | |
| 4,948,842 A | 8/1990 | Olivier | |
| 5,075,383 A | 12/1991 | Migdal et al. | |
| 5,219,480 A | 6/1993 | Gutierrez et al. | |
| 5,259,968 A | 11/1993 | Emert et al. | |
| 5,439,607 A | 8/1995 | Patil | |
| 5,498,355 A * | 3/1996 | Perozzi et al. ............. | 508/194 |
| 5,578,237 A | 11/1996 | Emert et al. | |

(Continued)

*Primary Examiner*—Stephen K Cronin
*Assistant Examiner*—Keith Coleman
(74) *Attorney, Agent, or Firm*—Thomas, Karceski, Raring & Teague, P.C.

(57) ABSTRACT

The present invention relates to an apparatus and method for delivering tungsten into a fuel combustion system or to the exhaust therefrom. By the present invention, tungsten from the lubricant or the fuel will interact with combustion products and, in particular, phosphorus, sulfur, and/or lead from the combustion products. In this manner, the tungsten scavenges or inactivates harmful materials which have migrated into the fuel or combustion products, and which can otherwise poison catalytic converters, sensors and/or automotive on-board diagnostic devices The present invention can also lead to improved durability of exhaust after treatment systems. A lubricant in accordance with the present invention is also disclosed.

33 Claims, 3 Drawing Sheets

U.S. PATENT DOCUMENTS

| | | | |
|---|---|---|---|
| 5,747,665 A * | 5/1998 | Thompson | 44/265 |
| 6,107,258 A | 8/2000 | Esche et al. | |
| 6,569,818 B2 * | 5/2003 | Nakazato et al. | 508/185 |
| 6,629,407 B2 | 10/2003 | Roos et al. | |
| 6,821,932 B2 | 11/2004 | Guinther et al. | |
| 6,941,743 B2 | 9/2005 | Roos et al. | |
| 6,949,152 B2 * | 9/2005 | Hallit et al. | 149/1 |
| 2007/0027045 A1 * | 2/2007 | Kleijwegt | 508/518 |
| 2007/0197407 A1 * | 8/2007 | Bardasz et al. | 508/199 |

* cited by examiner

Figure 1: Metal Efficiency at Diesel Soot Light-Off

Figure 2: Metal Gravimetric Efficiency in Soot Light-Off

FIG. 3

SCAVENGING PHOSPHORUS, SULFUR, AND LEAD FROM COMBUSTION EXHAUST USING TUNGSTEN COMPOUNDS AND LUBRICANT

FIELD OF THE INVENTION

The present invention relates to an apparatus and method for delivering tungsten from a lubricant source into a fuel combustion system or to the exhaust therefrom. By the present invention, tungsten from the lubricant will interact with phosphorus, sulfur, and/or lead from the combustion products. Tungsten can also enter the combustion system in the present invention as a component of the fuel being burned. In this invention, the tungsten scavenges or inactivates harmful materials which have migrated into the fuel or combustion products, and which can otherwise poison catalytic converters, sensors and/or automotive on-board diagnostic devices. The invention thus provides a method for improving combustion efficiency of a fuel being combusted in a combustion unit through the introduction therein of tungsten. The present invention can also lead to improved durability of exhaust after treatment systems.

BACKGROUND OF THE INVENTION

A problem exists in fuel combustion systems in which the fuel contains, or acquires, or produces upon combustion, one or more metal (e.g. lead), sulfur, and/or phosphorus contaminants that can poison or degrade catalytic converters, sensors, or on-board diagnostic devices.

An additional problem is created by such contaminants in the form of undesirably increased levels of certain combustion products or by-products in the exhaust.

Yet another problem from such contaminants is a detrimental effect on after treatment systems. These contaminants can include elemental phosphorus, lead and sulfur, or compounds thereof in the fuel, or in the air. The contaminants can also get into the fuel, or the combustion chamber, or the combustion exhaust stream from the engine lubricants which often contain phosphorus-containing and sulfur-containing additives, and lead compounds associated with combustion system wear.

It is a well-known phenomenon that vehicles and other combustion systems consume, that is the engine burns, oil used as a lubricant for the engine or moving parts of a combustion system. Various pathways exist for lubricating oil to enter the combustion system, and/or its exhaust stream. Clearly the various components or additives in the lubricating oil also are consumed or burned and these components or additives can have deleterious effects on the combustion system's catalysts, after treatment system, and emissions.

It is therefore desirable to inhibit, reduce or prevent the deleterious interaction of components (such as phosphorus, lead and/or sulfur arising from the lubricant source, air or fuel or otherwise entering the combustion process) with the combustion exhaust stream to thereby prevent catalyst poisoning, after treatment system malfunction, and increased emissions.

SUMMARY OF THE INVENTION

In an embodiment, the present invention provides a method to inhibit, reduce or prevent the deleterious interaction of components (such as phosphorus, lead and/or sulfur arising from the lubricant source, any processing aid or adjuvant, fuel, fuel additive, air or otherwise entering the combustion process) with the combustion exhaust stream of a combustion unit by the introduction to the unit or its exhaust stream of an effective amount of tungsten to thereby prevent catalyst poisoning, sensor poisoning, after treatment system malfunction, and/or increased emissions.

In another embodiment, the present invention provides a system for adding an effective amount of tungsten to the combustion of a fuel for scavenging phosphorus, lead and/or sulfur from the fuel or the products resulting from the combustion of the fuel. The tungsten interacts with or scavenges reaction products of the combustion process.

The present invention further relates to methods to improve the durability of an after treatment device for a combustion system, wherein the method includes contacting the products of the combustion of a hydrocarbonaceous fuel with a lubricant containing tungsten in an amount sufficient for the tungsten to interact with one or more contaminants selected from the group consisting of phosphorus, sulfur, lead or compounds thereof in said products to thereby reduce the amount of one or more of the contaminants contacting the after treatment device.

The present invention further provides a lubricating oil composition comprising an oil of lubricating viscosity, a detergent, an amount of a metal dihydrocarbyldithiophosphate compound, at least one oil-soluble tungsten compound in an amount sufficient to provide the composition with at least 10 ppm of tungsten, and an effective amount of a friction modifier, the composition having a Noack volatility of less than 15%.

By "tungsten" herein is meant any tungsten compound, source or material. Therefore, tungsten could be elemental tungsten, organotungsten, tungsten oxide, sulphur-containing organotungsten, sulphur- and phosphorus-free tungsten sources, and the like. By way of further example, the sulphur-containing organotungsten compound may be prepared by a variety of methods. One method would include reacting a sulphur-and phosphorus-free tungsten source with an amino group and one or more sulphur sources. Sulfur-containing tungsten compounds might also be the reaction of a sulphur-free tungsten source with an amino group or a thiuram group and, optionally, a second sulphur source.

Examples of sulfur- and phosphorus-free tungsten sources include tungsten acid, tungsten trioxide, ammonium ortho tungstate, ammonium metal tungstate, ammonium paratungstate, sodium tungstate, potassium tungstate, and tungsten halides.

Still additional tungsten compounds include, without limitation, tungsten hexacarbonyl, tungsten ethoxide, tungsten oxychloride, tungsten pentacarbonyl-N-pentylisonitrile, tungsten silicide, tungsten acid, cyclomatic tungsten compounds, tungsten organoamines, tungsten phosphenes, organo-oxo-tungstenates.

Still additional tungsten compounds may be in the form of nanoalloy tungsten lubricant additive compounds such as, without limitation, $MgWO_4$, $CaWO_4$, $ZnWO_4$, and the like.

The tungsten can be oil-soluble or dispersed or mixed in a lubricant or fuel. Available tungsten-containing compounds, and the production of the same, are illustrated in International Publication Number WO 2007/009022, which is hereby incorporated herein it its entirety.

The tungsten is preferably present in the lubricant as an oil-soluble additive that can volatilize and thereby enter the combustion chamber or exhaust stream. It may also enter the combustion chamber through "bulk" consumption, i.e., past valve guides or around piston rings By "base oil" herein is meant a base oil which can be selected from the group consisting of paraffinic, naphthenic, aromatic, poly-alpha-olefins, synthetic esters, and polyol esters, and mixtures thereof In a preferred embodiment, the base oil contains less than or equal to 0.03 wt. % sulfur, and greater than or equal to 90 wt. % saturates, and has a viscosity index greater than or equal to 80 and less than or equal to 120. In another embodiment, the base oil contains less than or equal to 0.03 wt. % sulfur, and greater than or equal to 90 wt. % saturates, and has a viscosity index greater than or equal to 120. In a more preferred embodiment, the base oil is substantially sulfur-free.

By "scavenging" herein is meant the contacting, combining with, reacting, incorporating, chemically bonding with or to, physically bonding with or to, adhering to, agglomerating with, affixing, inactivating, rendering inert, consuming, alloying, gathering, cleansing, consuming, or any other way or means whereby a first material makes a second material unavailable or less available.

By "interaction", "interacting" and "interacts" herein is meant scavenging.

By "inactivating" herein is meant scavenging.

By "hydrocarbonaceous fuel" herein is meant hydrocarbonaceous fuels such as but not limited to diesel fuel, jet fuel, alcohols, ethers, kerosene, low sulfur fuels, synthetic fuels, such as Fischer-Tropsch fuels, liquid petroleum gas, fuels derived from coal, genetically engineered biofuels and crops and extracts therefrom, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Oxygenates suitable for use in the fuels of the present invention include methanol, ethanol, isopropanol, t-butanol, mixed alcohols, methyl tertiary butyl ether, tertiary amyl methyl ether, ethyl tertiary butyl ether and mixed ethers. Oxygenates, when used, will normally be present in the reformulated gasoline fuel in an amount below about 25% by volume, and preferably in an amount that provides an oxygen content in the overall fuel in the range of about 0.5 to about 5 percent by volume. "Hydrocarbonaceous fuel" or "fuel" herein shall also mean waste or used engine or motor oils which gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics and other organic waste and/or by-products, and mixtures thereof, and emulsions, suspensions, and dispersions thereof in water, alcohol, or other carrier fluids. By "diesel fuel" herein is meant one or more fuels selected from the group consisting of diesel fuel, biodiesel, biodiesel-derived fuel, synthetic diesel and mixtures thereof. It is preferred that the hydrocarbonaceous fuel is substantially sulfur-free, by which is meant a sulfur content not to exceed on average about 30 ppm of the fuel.

By "combustion system" and "apparatus" herein is meant, for example and not by limitation herein, any diesel-electric hybrid vehicle, a gasoline-electric hybrid vehicle, a two-stroke engine, any and all burners or combustion units, including for example and without limitation herein, stationary burners, waste incinerators, diesel fuel burners, diesel fuel engines, automotive diesel engines, gasoline fuel burners, gasoline fuel engines, power plant generators, and the like. The hydrocarbonaceous fuel combustion systems that may benefit from the present invention include all combustion units, systems, devices, and/or engines that burn fuels. By "combustion system" herein is also meant any and all internal and external combustion devices, machines, engines, turbine engines, jet engines, boilers, incinerators, evaporative burners, plasma burner systems, plasma arc, stationary burners, and the like which can combust or in which can be combusted a hydrocarbonaceous fuel.

By "contacting" herein is meant the contacting, bringing together, reacting, complexing, coordinating, combining, admixing, mixing, and the like association between two or more materials, whether or not a chemical or physical reaction or change occurs.

By "essentially free of phosphorus and compounds thereof" is meant an amount of elemental phosphorus or a compound thereof which is less than about 10 ppm in the lubricant or resulting exhaust stream. Such low levels of phosphorus are desirable in many current lubricant formulations, and it is anticipated that lower levels of phosphorus in lubricants will be continually sought, perhaps required. A preferred level of phosphorus in the lubricant is an amount between 1 ppm and approximately 1500 ppm. A more preferred level of phosphorus in the lubricant is an amount between 500 ppm and 1200 ppm.

By "after treatment system" or "after treatment device" herein is meant any system or device which contacts the combustion product(s) from a combustion chamber in a manner designed to oxidize, reduce or otherwise treat the combustion product(s). Examples, but not by way of limitations herein, of such after treatment systems include an automobile three-way catalytic converter, lean $NO_x$ traps, catalyzed diesel particulate filter ("C-DPF") and a continuously regenerating technology diesel particulate filter. "After treatment system" also includes associated sensors like $O_2$ sensors and $NO_x$ sensors. Analogous gasoline combustion after treatment systems are known and are included herein as deriving benefit from the present invention.

It is to be understood that both the foregoing general description and the following detailed description are exemplary and explanatory only and are intended to provide further explanation of the present invention, as claimed.

DETAILED DESCRIPTION OF THE PRESENT INVENTION

In a more specific embodiment, the present invention provides a method for reducing the amount of, or the deleterious effect on exhaust emissions after treatment and control devices from, at least one contaminant selected from the group consisting of phosphorus, lead, sulfur, and compounds thereof in an exhaust stream from the combustion of a hydrocarbonaceous fuel in a combustion system lubricated by a lubricant, said method including the steps: (a) lubricating the combustion system with the lubricant comprising a major amount of a base oil of lubricating viscosity and a minor amount of one or more additives comprising (i) at least one organosulfur compound, or at least one organophosphorus compound, or both, and (ii) at least one tungsten source; (b) combusting in the combustion system the hydrocarbonaceous fuel to produce combustion products comprising at least one contaminant material selected from the group consisting of sulfur, lead, phosphorus, and compounds thereof; and (c) contacting the tungsten with the combustion products, whereby the tungsten interacts with the combustion products. The tungsten can scavenge or interact with reaction products of the combustion process. In particular, the interaction between the tungsten and the sulfur, lead, phosphorus, and/or compounds thereof generates the scavenging of these specific contaminants, whereby several beneficial results will be obtained. By scavenging at least one and preferably more or all of the contaminants, the beneficial results include maintaining catalytic converter performance, maintaining sensor performance, maintaining LNT performance, improved durability of exhaust system, and maintaining diesel particulate filter (DPF) performance.

The present invention is also thought to provide a method of improving the combustion of a fuel in a combustion system for improving DPF performance, as determined by reduced thermal gravimetric analysis soot light-off temperature, said method comprising introducing a combustion improving amount of tungsten to the combustion in a combustion system of a fuel, whereby the thermal gravimetric analysis light-off temperature is reduced relative to the thermal gravimetric analysis light-off temperature achieved in the absence of the introduction of tungsten.

The present invention further provides a lubricating oil composition comprising an oil of lubricating viscosity, a detergent, an amount of a metal dihydrocarbyldithiophosphate compound, at least one oil-soluble tungsten compound in an amount sufficient to provide the composition with at least 10 ppm of oil-soluble tungsten, and an effective amount of a friction modifier, the composition havine a Noack volatility of less than 15%. The use of detergents and friction modifiers, and the types of each and the applicable treat rates, are known in the art and do not require further discussion herein. For instance, the friction modifier can be an organic, ashless (metal-free), nitrogen-free organic friction modifier as known in the art and provided at known rates. U.S. Pat. No. 6,723,685 is hereby incorporated by reference. Other inhibitors and modifiers may be added as well.

The tungsten in the oil composition is preferably provided in an amount of from about 10 ppm to about 750 ppm, such as 10 ppm to 350 ppm, more preferably from about 30 ppm to about 200 ppm, and still more preferably in an amount of from about 50 ppm to about 100 ppm, based on the total weight of the lubricating composition.

When cars are operated with tungsten in the lubricant, less phosphorus, sulfur, and lead will be deposited on the car's catalytic converter. According to the present invention, less phosphorus, sulfur and lead will be deposited throughout the catalyst when tungsten is combusted in or with the fuel. Tungsten will combine in the combustion or exhaust stream with phosphorus and/or sulfur to form stable tungsten-phosphorus and/or tungsten sulfate species that do not form impermeable or reduced-permeability glazes on the catalyst. With less impermeable glaze on the catalyst, less emissions will "break through", i.e., pass through as unconverted emissions. Therefore, it is thought to be desirable to have tungsten in the combustion and/or exhaust stream.

Thus, the present invention provides a method to inhibit the formation of a phosphorus-containing, sulfur-containing, or lead-containing permeability-reducing glaze on the surface of a catalyst exposed to the products from the combustion in a combustion unit of a fuel, wherein the method includes contacting tungsten with the products of combustion of the fuel, wherein the products contain at least one member selected from the group consisting of phosphorus-containing, sulfur-containing and lead-containing materials. The sulfur-containing materials can poison the active metals of the catalyst whether or not a sulfur-containing glaze is formed on the surface of the catalyst.

As an additional benefit, tungsten in the exhaust after treatment system should be expected to scavenge lead. This should prevent lead poisoning of the exhaust emissions after treatment equipment.

Tungsten in the combustion stream should then scavenge catalyst pollutants by tying them up as sulfides, phosphates, and lead tungstenates. Upon scavenging, the tungsten and scavenged component form $PbWO_4$, $MgWO_4$, $MnWO_4$, $FeWO_4$, $CaWO_4$, and the like. These product compounds then participate further in emissions control.

Thermal gravimetric analysis (TGA) testing could determine the effect of fuel soluble metal additives on the temperature of maximum soot oxidation, as follows. Particulate matter (PM) generated from a 1998 Cummins M-11 engine operated on the US EPA transient emissions cycle would be collected on a quartz fiber filter. The oil used would be a heavy-duty diesel oil with ZDDP in the additive package. Such oils roughly contain, in parts per million (ppm), phosphorus (1264), sulfur (4000), zinc (1437), boron (407), calcium (3614), and magnesium (18). A base fuel of a number 2 diesel fuel with approximately 388 ppm by weight sulfur would be used. From this fuel, three additional fuels would be made by adding strontium, manganese, and tungsten at 20 mg metal per liter fuel, respectively. For each separate fuel, PM generated during three consecutive EPA Heavy-Duty Transient cycles would be collected on a single filter using a Pierburg PS2000A particulate sampling system. TGA would be then performed on small sections of each PM loaded filter using a TA Instruments Model 2950. Sample temperatures increase at a rate of 20° C./minute under air at ambient pressure for all runs. From a plot of weight loss vs. time, the temperature at which the maximum soot oxidation rate occurred is then determined.

Figure 1:
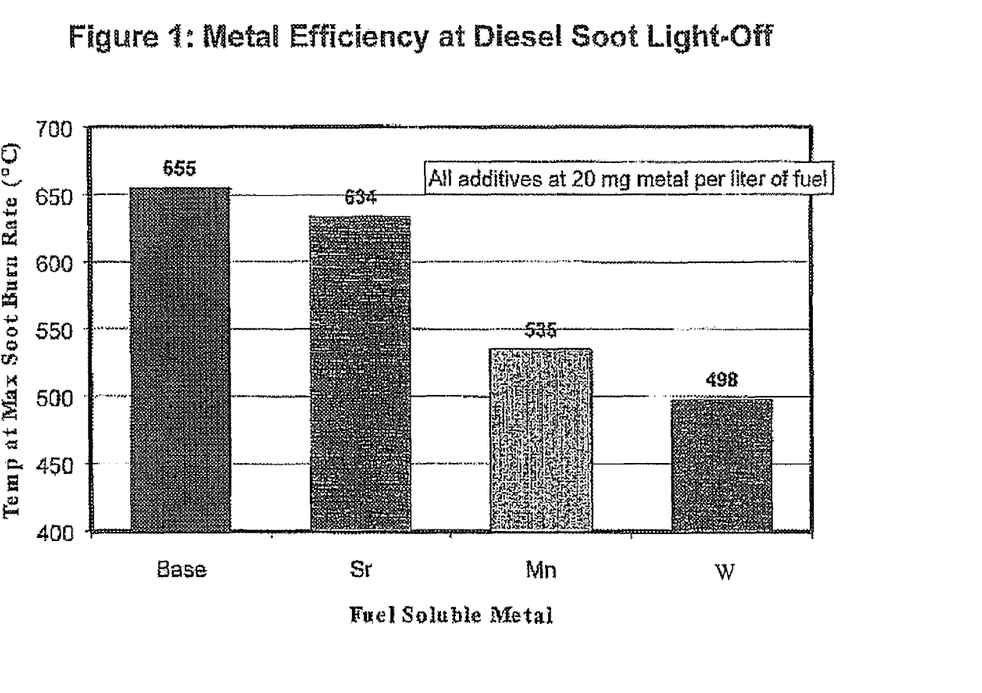
FIG. 1 is a graph demonstrating predicted metal efficiency at diesel soot light off using thermal gravimetric analysis testing.
Figure 2:
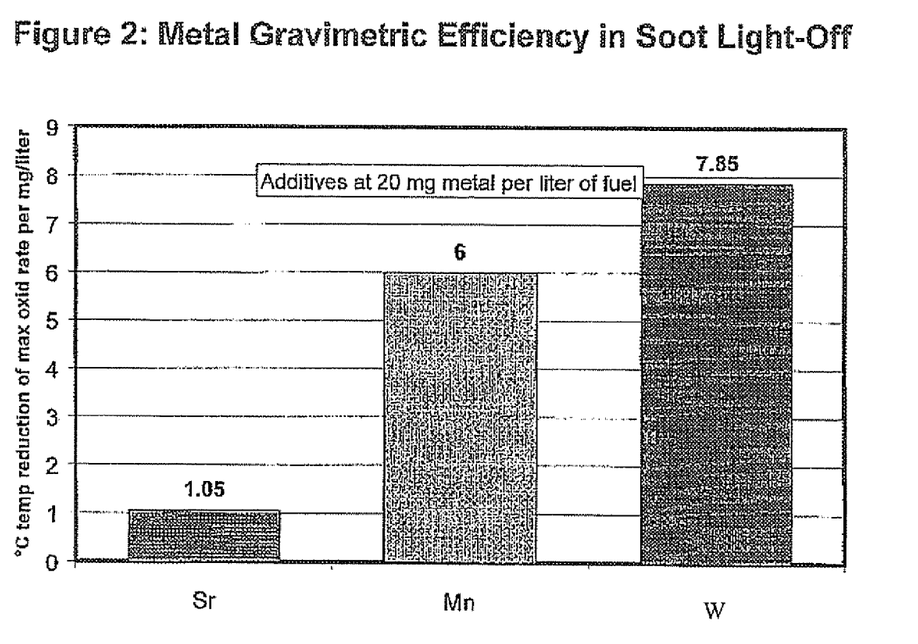
FIG. 2 is a graph demonstrating predicted metal gravimetric efficiency in soot light-off using thermal gravimetric analysis testing.
Figure 3:
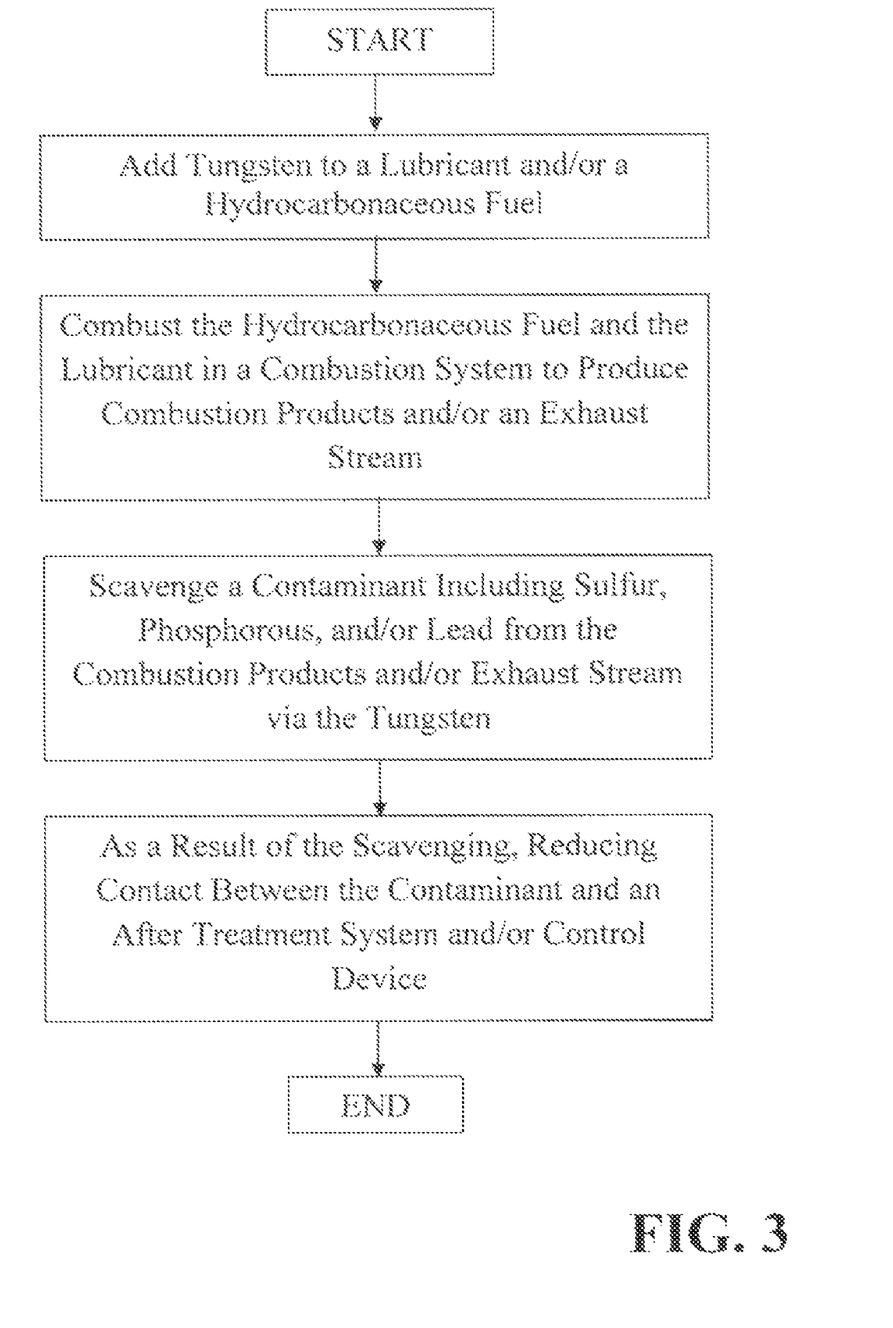
FIG. 3 is a flow chart illustrating one embodiment of the method contemplated by the present invention.

The TGA results of the four sets of particulates should appear as in FIGS. 1 and 2. FIG. 1 shows the metal additives in mg metal per liter of fuel while FIG. 2 show the predicted gravimetric efficiency of the respective metals. Both Figures show that scavenging the sulfur and phosphorus coming from the fuel and oil used with the tungsten should lower the light off temperature by approximately 160° C. from that of the base fuel (655° C.) to that of the tungsten containing system (~500° C.). These results illustrate that after scavenging sulfur, phosphorus, and lead from the combustion/exhaust system, the resultant tungsten products would also be active in carbon burnout chemistry and should result in further soot lowering as shown in FIGS. 1 and 2. If the emissions control system contains a catalyst of any nature, for example, a continuously regenerating diesel particulate filter (DPF), or a diesel oxidation catalyst, and/or a lean $NO_x$ trap (LNT), then these emission control units would also be protected from the sulfur, phosphorus, and lead poisoning and therefore retain their performance level so long as the tungsten scavenger is in the system. This tungsten synergism with the system catalysts in soot oxidation is a predicted bonus to the scavenging benefit of the tungsten that would be added to the lubricant.

It should be understood that the contaminants being scavenged according to the present invention by the tungsten from the lubricant could originate from the air utilized in the combustion of the hydrocarbonaceous fuel.

In another embodiment, the contaminants being scavenged according to the present invention by the tungsten can originate from the hydrocarbonaceous fuel.

In yet another embodiment of the present invention, the contaminants being scavenged by the tungsten can originate from the lubricant used to lubricate the combustion system.

In one embodiment, the lubricant-borne tungsten which will scavenge the contaminant(s) can bleed, "blow-by", flow, seep, be forced or compressed, be drawn, sucked, or aspirated or otherwise accidentally or deliberately get into a combustion chamber of the combustion system. In this embodiment, the contaminant(s) encounter and interact with the tungsten during or after the combustion process, whereby scavenging occurs. Thus an embodiment of a method of the present invention is achieved when lubricant containing tungsten escapes around a valve in the combustion system, such as for example and not as a limitation herein, an intake valve or an exhaust valve in an automotive engine. In this manner, the tungsten is caused to encounter and interact with the contaminant(s), whereby scavenging can occur.

In another embodiment, the tungsten is caused, deliberately or inadvertently, to encounter the contaminant(s) in a passageway through which the combustion products containing the contaminant(s) are conveyed away from the combustion chamber. In this manner, the scavenging occurs outside the combustion chamber of the combustion system.

In another embodiment of the present invention, the tungsten volatilizes from the lubricant and is carried over into the combustion chamber containing the fuel.

In yet another embodiment, the combustion system utilizes a deliberate recirculating process, whereby vapors in a crankcase are recirculated into either the intake manifold or the combustion chamber. In this manner, any lubricant containing the phosphorus, sulfur, and/or lead contaminants is caused to encounter and interact with tungsten in the combustion or exhaust.

In one embodiment, the fuel or the exhaust from its combustion is treated with a low level of tungsten, such as for example, a tungsten level of about 20 ppm tungsten in the fuel or combustion exhaust or less.

This invention would also achieve catalyst protection and contaminant scavenging when the fuel combusted contains an oil having a tungsten compound, without extra tungsten being delivered to the combustion unit or its exhaust from a lubricant source.

The present invention provides in another embodiment an apparatus for performing a method for reducing the amount of, or deleterious effect on exhaust emissions after treatment and control devices of, at least one contaminant selected from the group consisting of phosphorus, lead, sulfur and compounds thereof in an exhaust stream, wherein the apparatus contains (a) a combustion chamber adapted to combust a hydrocarbonaceous fuel; (b) a means to introduce the hydrocarbonaceous fuel into the combustion chamber; (c) a means to convey combustion product from the combustion chamber; (d) a lubricant comprising a major amount of a base oil of lubricating viscosity and a minor amount of one or more additives comprising (i) at least one organosulfur compound, or at least one organophosphorus compound, or both, and (ii) at least one tungsten source; and (e) a means to introduce the lubricant to the combustion product. The apparatus can further contain an after treatment device or system.

According to one embodiment of the present invention, the organosulfur compound in the lubricant can be selected from the group consisting of sulfurized olefins, sulfurized fats and vegetable oils, sulfurized unsaturated esters and amides, ashless and metal containing dithiocarbamates, substituted thiadiazoles, sulfurized hindered phenols, sulfurized alkylphenols, neutral metal-containing sulfonate detergents, overbased metal-containing sulfonate detergents, neutral metal-containing sulfurized phenate detergents, and overbased metal-containing sulfurized phenate detergents, or combinations and mixtures thereof.

According to another embodiment, the organophosphorus compound in the lubricant can be selected from the group consisting of primary, secondary and aryl neutral and overbased zinc dialkyldithiophosphates (ZDDP's), trialkyl- and triarylphosphites, mixed alkyl/aryl phosphites, alkyl and aryl phosphorothiolthionates, and alkyl and aryl phosphorothionates, and combinations or mixtures thereof.

It is therefore believed that by the use of the present invention a significant reduction in the amount of phosphorus detected on a device such as a catalyst can be achieved when tungsten is in the exhaust stream from a combustion system. Specifically, reductions in the amount of such contaminants above 20% by weight, and more preferably reductions in an amount of from 60% to 80% by weight detected on the after treatment device will be achieved by the present invention. This will produce a dramatic and highly desirable benefit in the improved durability of such after treatment devices or systems.

Other embodiments of the present invention will be apparent to those skilled in the art from consideration of the specification. It is intended that the specification and Figures be considered as exemplary only, with a true scope and spirit of the invention being indicated by the following claims.

What is claimed is:

1. In a combustion system that combusts a hydrocarbonaceous fuel and a lubricant to produce an exhaust stream comprising at least one contaminant selected from a group consisting of phosphorous, lead, sulfur, and compounds thereof, a method for reducing deleterious effects of the at least one contaminant on an after treatment and/or a control device, comprising:
   via a tungsten source, adding tungsten to the lubricant;
   wherein the lubricant comprises a major amount of a base oil of lubricating viscosity and a minor amount of at least one additive selected from a group comprising at least one of an organosulfur compound and an organophosphorous compound,
   wherein the tungsten source is selected from a group comprising elemental tungsten, organotungsten, tungsten oxide, sulphur-containing organotungsten, sulphur- and phosphorus-free tungsten compounds, tungsten acids, tungsten trioxide, ammonium ortho tungstate, ammonium metal tungstate, ammonium paratungstate, sodium tungstate, potassium tungstate, tungsten halides, tungsten hexacarbonyl, tungsten ethoxide, tungsten oxychloride, tungsten pentacarbonyl-N-pentylisonitrile, tungsten silicide, cyclomatic tungsten compounds, tungsten organoamines, tungsten phosphenes, organo-oxo-tungstenates, $MgWO_4$, $CaWO_4$, and $ZnWO_4$;
   combusting the hydrocarbonaceous fuel and the lubricant in the combustion system, thereby producing the exhaust stream;
   during or after the combusting, exposing the tungsten to the at least one contaminant;
   during or after the combusting, scavenging at least some of the at least one contaminant; and
   as a result of the scavenging, reducing contact between the at least one contaminant and the after treatment system and/or the control device, thereby reducing the deleterious effects of the at least one contaminant on the after treatment system and/or the control device.

2. The method of claim 1, wherein the at least one contaminant originates from the fuel.

3. The method of claim 1, wherein the at least one contaminant originates from air used in the combustion.

4. The method of claim 1, wherein the at least one contaminant originates from the lubricant.

5. The method of claim 1, wherein the exhaust stream is essentially free of phosphorus and compounds thereof following scavenging.

6. The method of claim 1, wherein the after treatment system comprises at least one selected from a group comprising a catalytic converter, a three-way catalytic converter a lean $NO_x$ trap, a catalyzed diesel particulate filter, a diesel oxidation catalyst, a continuously regenerating technology diesel particulate filter, an $O_2$ sensor, and an $NO_x$ sensor.

7. The method of claim 1, wherein the control device comprises at least one selected from a group comprising a sensor and an on-board diagnostic device.

8. The method of claim 1, wherein the combustion system comprises at least one selected from a group consisting of a diesel-electric hybrid vehicle, a gasoline-electric hybrid vehicle, a two-stroke engine, stationary burners, waste incinerators, diesel fuel burners, diesel fuel engines, automotive diesel engines, gasoline fuel burners, gasoline fuel engines, power plant generators, internal and external combustion devices, machines, engines, turbine engines, jet engines, boilers, incinerators, evaporative burners, plasma burner systems, a plasma arc, stationary burners, and devices that can combust or in which can be combusted a hydrocarbonaceous fuel.

9. The method of claim 1, wherein the hydrocarbonaceous fuel is selected from a group consisting of diesel fuel, biodiesel, biodiesel-derived fuel, synthetic diesel, jet fuel, alcohols, ethers, kerosene, low sulfur fuels, synthetic fuels, Fischer-Tropsch fuels, fuels derived from coal, genetically engineered biofuels and crops and extracts therefrom, natural gas, propane, butane, unleaded motor and aviation gasolines, reformulated gasolines which contain both hydrocarbons of the gasoline boiling range and fuel-soluble oxygenated blending agents, gasoline, bunker fuel, coal (dust or slurry), crude oil, used engine or motor oils, refinery "bottoms" and by-products, crude oil extracts, hazardous wastes, yard trimmings and waste, wood chips and saw dust, agricultural waste, fodder, silage, plastics, organic waste, and mixtures thereof, and emulsions, suspensions, and dispersions thereof in water, alcohol, and other carrier fluids.

10. An apparatus for performing the method of claim 1, said apparatus comprising:
    (a) a combustion chamber adapted to combust the hydrocarbonaceous fuel and the lubricant:
    (b) a means to introduce the hydrocarbonaceous fuel and the lubricant into the combustion chamber;
    (c) a means to convey the exhaust stream from the combustion chamber; and
    (d) a means to introduce the lubricant to the exhaust stream.

11. The apparatus of claim 10, wherein the after treatment system comprises at least one selected from a group comprising a catalytic converter, a three-way catalytic converter, a lean $NO_x$ trap, a catalyzed diesel particulate filter, a continuously regenerating technology diesel particulate filter, an $O_2$ sensor, and an $NO_x$ sensor.

12. The apparatus of claim 10, wherein the control device comprises at least one selected from a group comprising a sensor and an on-board diagnostic device.

13. The apparatus of claim 10, wherein the apparatus comprises at least one selected from a group consisting of a diesel-electric hybrid vehicle, a gasoline-electric hybrid vehicle, a two-stroke engine, stationary burners, waste incinerators, diesel fuel burners, diesel fuel engines, automotive diesel engines, gasoline fuel burners, gasoline fuel engines, power plant generators, internal and external combustion devices, machines, engines, turbine engines, jet engines, boilers, incinerators, evaporative burners, plasma burner systems, a plasma arc, stationary burners, and devices that can combust or in which can be combusted a hydrocarbonaceous fuel.

14. A method for improving the durability of an after treatment device for a combustion system, said method comprising:
    selecting a tungsten source from a group consisting of elemental tungsten, organotungsten, tungsten oxide, sulphur-containing organotungsten, sulphur- and phosphorus-free tungsten compounds, tungsten acids, tungsten trioxide, ammonium ortho tungstate, ammonium metal tungstate, ammonium paratungstate, sodium tungstate, potassium tungstate, tungsten halides, tungsten hexacarbonyl, tungsten ethoxide, tungsten oxychloride, tungsten pentacarbonyl-N-pentylisonitrile, tungsten silicide, cyclomatic tungsten compounds, tungsten organoamines, tungsten phosphenes, organo-oxo-tungstenates, $MgWO_4$, $CaWO_4$, and $ZnWO_4$;
    combusting a hydrocarbonaceous fuel and a lubricant in the combustion system;
    as a result of the combusting, producing a combustion product containing at least one contaminant selected from a grout) consisting of phosphorous, sulfur, lead, and compounds thereof;
    introducing tungsten, via the tungsten source, into at least one of the hydrocarbonaceous fuel or the lubricant in an amount sufficient for the tungsten to interact with the at least one contaminant;
    with the tungsten, scavenging at least some of the at least one contaminant from the combustion product:
    as a result of the scavenging, reducing contact between the at least one contaminant and the after treatment device, thereby improving the durability of the after treatment device.

15. The method of claim 14, wherein the amount of phosphorus detected on the after treatment device is reduced by an amount of from 20% to 80% by weight, relative to the amount of phosphorus detected if the tungsten is not contacted with the combustion product.

16. The method of claim 14, wherein the amount of sulfur detected on the after treatment device is reduced by an amount of from 20% to 80% by weight, relative to the amount of sulfur detected if the tungsten is not contacted with the combustion product.

17. The method of claim 14, wherein the amount of lead detected on the after treatment device is reduced by an amount of from 20% to 80% by weight, relative to the amount of lead detected if the tungsten is not contacted with the combustion product.

18. The method of claim 1, wherein the organosulfur compound in the lubricant is selected from a group consisting of sulfurized olefins, sulfurized fats and vegetable oils, sulfurized unsaturated esters and amides, ashless and metal containing dithiocarbamates, substituted thiadiazoles, sulfurized hindered phenols, sulfurized alkylphenols, neutral metal-containing sulfonate detergents, overbased metal-containing sulfonate detergents, neutral metal-containing sulfurized phenate detergents, and overbased metal-containing sulfurized phenate detergents, or combinations and mixtures thereof.

19. The method of claim 1, wherein the organophosphorus compound in the lubricant is selected from a group consisting of primary, secondary and aryl neutral and overbased zinc dialkyldithiophosphates (ZDDP's), trialkyl- and triarylphosphites, mixed alkyl/aryl phosphites, alkyl and aryl phosphorothiolthionates, and alkyl and aryl phosphorothionates, and combinations or mixtures thereof.

20. The method of claim 1, wherein the base oil is selected from a group consisting of paraffinic, naphthenic, aromatic, poly-alpha-olefins, synthetic esters, and polyol esters, and mixtures thereof.

21. The method of claim 1, wherein the base oil contains less than or equal to 0.03 wt. % sulfur, and greater than or equal to 90 wt. % saturates, and has a viscosity index greater than or equal to 80 and less than or equal to 120.

22. The method of claim 1, wherein the base oil contains less than or equal to 0.03 wt. % sulfur, and greater than or equal to 90 wt. % saturates, and has a viscosity index greater than or equal to 120.

23. The method of claim 1, wherein the base oil is substantially sulfur-free.

24. The method of claim 1, wherein the hydrocarbonaceous fuel contains low levels of sulfur.

25. The method of claim 1, wherein the hydrocarbonaceous fuel is substantially free of sulfur.

26. The method of claim 1, wherein the hydrocarbonaceous fuel contains low levels of sulfur and is further treated with oxygenates.

27. The method of claim 1, wherein the hydrocarbonaceous fuel is substantially free of sulfur and is further treated with oxygenates.

28. A method of improving the combustion of a fuel in a combustion system, as determined by reduced thermal gravimetric analysis light-off temperature of combustion particulate products, said method comprising:
   lubricating a combustion system with a lubricant comprising a major amount of a base oil of lubricating viscosity and a minor amount at least one tungsten source;
   introducing tungsten to the combustion in the combustion system of the fuel;
   selecting the fuel from the group consisting of diesel fuel and motor and aviation gasolines;
   with the tungsten, scavenging at least some of at least one contaminant from the combustion product, wherein the at least one contaminant is selected from a group consisting of phosphorous, sulfur, lead, and compounds thereof;
   as a result of the scavenging, reducing the thermal gravimetric analysis light-off temperature of combustion particulate products in the presence of tungsten relative to the thermal gravimetric analysis light-off temperature of combustion particulate products in the absence of tungsten, thereby improving the combustion of the fuel in the combustion system.

29. A method to inhibit the formation of a phosphorus-containing, sulfur-containing, or lead-containing permeability-reducing glaze on the surface of a catalyst exposed to the products from the combustion in a combustion unit of a fuel, said method comprising:
   adding tungsten to at least one of the fuel or a lubricant for the combustion unit;
   contacting the tungsten or compounds thereof with the products of combustion of the fuel, wherein the combustion products contain at least one contaminant selected from the group consisting of phosphorus-containing, sulfur-containing and lead-containing materials;
   scavenging the at least one contaminant from the combustion products via the tungsten; and
   due to the scavenging, inhibiting the formation of a permeability-reducing glaze containing the at least one contaminant on a surface of a catalyst exposed to the products of combustion of the fuel.

30. A method for reducing the deleterious effect on exhaust emissions after treatment and control devices of at least one contaminant selected from the group consisting of phosphorus, lead, sulfur and compounds thereof in an exhaust stream from the combustion of a hydrocarbonaceous fuel containing a tungsten compound in a combustion system, said method comprising:
   combusting in the combustion system the hydrocarbonaceous fuel containing the tungsten compound to produce combustion products comprising at least one material selected from the group consisting of sulfur, lead, phosphorus, and compounds thereof,
   scavenging at least one of the contaminants selected from the group consisting of sulfur, lead, phosphorus, and compounds thereof via the tungsten, and
   as a result of the scavenging, reducing contact between the at least one contaminant and the after treatment system and the control devices, thereby reducing the deleterious effect of the at least one contaminant on the after treatment system and control devices.

31. A lubricating oil composition comprising:
   an oil of lubricating viscosity,
   at least one additive selected from a group comprising at least one of an organosulfur compound and an organophosphorous compound,
   a detergent,
   an amount of a metal dihydrocarbyldithiophosphate compound,
   at least one tungsten compound in an amount sufficient to provide the composition with at least 10 ppm of tungsten,
   wherein the tungsten compound selected from a group comprising elemental tungsten, organotungsten, tungsten oxide, sulphur-containing organotungsten, sulphur- and phosphorus-free tungsten compounds, tungsten acids, tungsten trioxide, ammonium ortho tungstate, ammonium metal tungstate, ammonium paratungstate, sodium tungstate, potassium tungstate, tungsten halides, tungsten hexacarbonyl, tungsten ethoxide, tungsten oxychloride, tungsten pentacarbonyl-N-pentylisonitrile, tungsten silicide, cyclomatic tungsten compounds, tungsten organoamines, tungsten phosphenes, organo-oxo-tungstenates, $MgWO_4$, $CaWO_4$, and $ZnWO_4$, and
   an effective amount of a friction modifier,
   wherein said composition has a Noack volatility of about 15 wt % or less.

32. The composition of claim 31, wherein said tungsten from the at least one tungsten compound is present in an amount of about 10 ppm to about 750 ppm.

33. The composition of claim 32, wherein the tungsten is present in an amount of about 10 ppm to about 350 ppm.

* * * * *